(No Model.)

G. M. HARRIS.
VEHICLE SPRING BRACE.

No. 468,340. Patented Feb. 9, 1892.

WITNESSES:

INVENTOR
Geo. M. Harris
BY
ATTORNEY.

UNITED STATES PATENT OFFICE.

GEORGE M. HARRIS, OF LOUISVILLE, KENTUCKY.

VEHICLE-SPRING BRACE.

SPECIFICATION forming part of Letters Patent No. 468,340, dated February 9, 1892.

Application filed November 17, 1890. Serial No. 371,723. (No model.)

*To all whom it may concern:*

Be it known that I, GEORGE M. HARRIS, a citizen of the United States, and a resident of Louisville, in the county of Jefferson and State of Kentucky, have invented certain new and useful Improvements in a Regulator or Spring-Brace for Vehicles; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
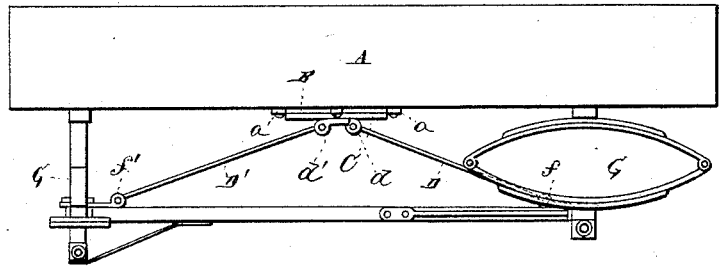
Figure 2:
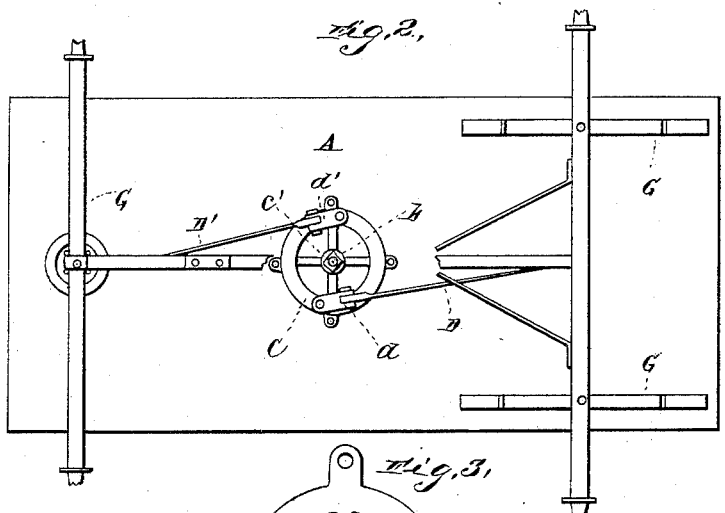
Figure 3:
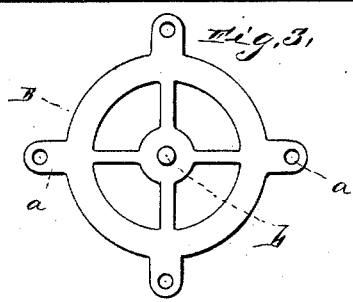
Figure 4:
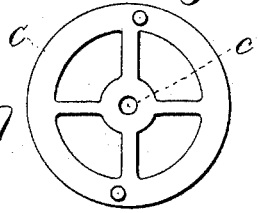

Figure 1 of the drawings is a side elevation. Fig. 2 is a bottom plan view, and Figs. 3 and 4 are detail views showing the disks B and C.

My invention relates to the provision of spring regulators or braces for vehicles, whereby the springs are prevented from rocking; and it consists in the construction and arrangement of parts, as hereinafter described.

In the accompanying drawings, the letter A designates the body of a vehicle, having secured to its under side, centrally between the forward and rear springs, a plate or disk B, having the perforated lugs or ears $a$ for the fastening-bolts. The disk or plate also has the central pivot or stud $b$.

C is a second circular disk or plate, of the same diameter as the plate B and having the central perforation $c$, adapted to engage and work on the pivot or stud $b$, a nut $c'$ securing the plate C in position, but not sufficiently tight to prevent its turning or working on the surface of plate B. The disks or plates B and C have their respective bearing-surfaces adapted to cause as little friction as possible.

At diametrically-opposite sides of the plate C, on its lower surface, are pivotally secured the lugs or ears $d\ d'$, lying within the periphery of said plate, and to which is pivoted one end of the rods or links $D\ D'$, respectively. These lugs extend horizontally in opposite directions and work in a plane parallel to the movement of the disk. The opposite end of the rod or link D is pivoted to an ear or lug $f$, secured to the reach and rear axle of the vehicle, while the opposite end of link or rod $D'$ is pivotally secured to a similar lug or ear on a plate $f'$, secured to the forward bolster by clips and bolts.

It will be seen that when the vehicle becomes loaded sufficiently to compress the springs G it will bear upon the pivoted rods or links, causing them to act on the plate or disk C, on the opposite sides of which they are pivoted in opposite directions, causing it to turn on the pivot or stud $b$ of plate or disk B, the two rods or links acting or bracing against each other, preventing any rocking or end-to-end movement of the springs, especially in going up or down grade or over rough and uneven ground and when one end of the wagon is more heavily loaded than the other.

I am aware that it is not new to provide spring-regulating braces working on this principle, and I do not therefore claim such a brace, broadly; but, Having described the invention, what I claim, and desire to secure by Letters Patent, is—

The spring-regulating brace for vehicles, comprising the circular disk or plate secured to the under surface of the wagon-body and having a smooth under surface provided with a central downwardly-projecting pivot-stud, a second disk of even diameter therewith, having a central aperture therein loosely engaging said pivot-stud and having a smooth upper surface adapted to play on the under surface of the first-named disk, a horizontally-extending lug pivotally secured to the under surface of said lower disk on opposite sides and at diametrically-opposite points and working in a plane parallel with the movement of the disk, said lugs extending in opposite directions and lying parallel with each other within the periphery of said disk, said lugs having vertical pivots, and rods or links, each pivoted at one end to one of said lugs, the pivots of the lugs and the pivots of the rods or links all being about equidistant from the center, said rods or links at their opposite ends connected to the running-gear, one to the reach thereof and the other to the forward bolster, substantially as specified.

In testimony whereof I affix my signature in presence of two witnesses.

GEORGE M. HARRIS.

Witnesses:
J. L. WOODS,
J. W. KNAPP.